United States Patent
Ogihara et al.

(10) Patent No.: US 12,233,588 B2
(45) Date of Patent: *Feb. 25, 2025

(54) RESIN CONTAINER MANUFACTURING APPARATUS, TEMPERATURE ADJUSTING DEVICE, RESIN CONTAINER MANUFACTURING METHOD, AND TEMPERATURE ADJUSTING METHOD

(71) Applicant: NISSEI ASB MACHINE CO., LTD., Nagano (JP)

(72) Inventors: Manabu Ogihara, Nagano (JP); Atsushi Nagasaki, Nagano (JP); Kazuhiro Horiuchi, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,020

(22) Filed: Dec. 13, 2023

(65) Prior Publication Data

US 2024/0181693 A1 Jun. 6, 2024

Related U.S. Application Data

(63) Continuation of application No. 17/426,739, filed as application No. PCT/JP2020/003644 on Jan. 31, 2020, now Pat. No. 11,919,221.

(30) Foreign Application Priority Data

| Jan. 31, 2019 | (JP) | 2019-015990 |
| Apr. 9, 2019 | (JP) | 2019-074204 |
| Sep. 30, 2019 | (JP) | 2019-178507 |

(51) Int. Cl.
B29C 49/48 (2006.01)
B29B 11/08 (2006.01)
(Continued)

(52) U.S. Cl.
CPC .............. *B29C 49/06* (2013.01); *B29B 11/08* (2013.01); *B29C 49/4823* (2013.01);
(Continued)

(58) Field of Classification Search
CPC ............ B29C 49/6463; B29C 49/6458; B29C 49/643; B29C 49/4823; B29C 49/483
See application file for complete search history.

(56) References Cited

U.S. PATENT DOCUMENTS 11,919,221 B2 * 3/2024 Ogihara .............. B29C 49/4823
2008/0296801 A1 12/2008 Zoppas
(Continued)

FOREIGN PATENT DOCUMENTS

| CN | 104010794 | 8/2014 |
| CN | 106346754 | 1/2017 |

(Continued)

OTHER PUBLICATIONS

International Search Report issued in International Patent Application No. PCT/JP2020/003644, dated Apr. 14, 2020, along with an English translation thereof.

(Continued)

*Primary Examiner* — Robert B Davis
(74) *Attorney, Agent, or Firm* — Greenblum & Bernstein, P.L.C.

(57) ABSTRACT

A blow molding device in which a preform is injection-molded, the injection-molded preform is temperature-controlled by a temperature adjusting unit, and the temperature-adjusted preform is blow-molded, wherein the temperature adjusting unit has a multistage structure in which an uppermost stage has the highest temperature structure, and the mold surface temperatures of lower stages and other than the uppermost stage are set to be 10° C. or more lower than the glass transition temperature of the preform.

14 Claims, 14 Drawing Sheets

(51) Int. Cl.
  *B29C 49/06* (2006.01)
  *B29C 49/64* (2006.01)
  *B29C 49/68* (2006.01)
  *B29C 49/78* (2006.01)
  *B29L 31/00* (2006.01)

(52) U.S. Cl.
  CPC ...... *B29C 49/6427* (2013.01); *B29C 49/6458* (2022.05); *B29C 49/6463* (2013.01); *B29C 49/68* (2013.01); *B29C 49/786* (2013.01); *B29C 49/78* (2013.01); *B29C 2949/078* (2022.05); *B29L 2031/7158* (2013.01)

(56) References Cited

U.S. PATENT DOCUMENTS

| | | | |
|---|---|---|---|
| 2014/0131920 | A1 | 5/2014 | Nakahara |
| 2014/0377394 | A1 | 12/2014 | Le Pechour et al. |
| 2016/0361860 | A1 | 12/2016 | Nakahara |
| 2017/0157832 | A1 | 6/2017 | Wagner et al. |
| 2018/0079127 | A1 | 3/2018 | Aoki |
| 2018/0257264 | A1 | 9/2018 | Kawamur et al. |
| 2019/0389117 | A1 | 12/2019 | Harigome |
| 2021/0394420 | A1 | 12/2021 | Horigome |

FOREIGN PATENT DOCUMENTS

| | | |
|---|---|---|
| EP | 0 256 777 | 2/1988 |
| JP | 04-065216 | 3/1992 |
| JP | 04-275130 | 9/1992 |
| JP | 5-185493 | 7/1993 |
| JP | 5-330535 | 12/1993 |
| JP | 06-238742 | 8/1994 |
| JP | 6-315973 | 11/1994 |
| JP | 2016-199053 | 12/2016 |
| WO | 2012/111728 | 8/2012 |
| WO | 2013/012067 | 1/2013 |
| WO | 2017/090774 | 6/2017 |
| WO | 2017/098673 | 6/2017 |
| WO | 2017/142043 | 8/2017 |

OTHER PUBLICATIONS

Written Opinion of the International Searching Authority issued in International Application No. PCT/JP2020/003644, dated Apr. 14, 2020, along with an English translation thereof.
Office Action issued in the corresponding Indian Patent Application No. 202127034220 dated Apr. 20, 2022, along with English Translation thereof.
European Partial Supplementary Search Report issued to European Patent Application No. 20747987.4 on Aug. 25, 2022.
Extended European Search Report issued to corresponding European Patent Application No. 20747987.4 dated Dec. 6, 2022.
Notice of Hearing Issued in Corresponding Indian Patent Application No. 202127034220, dated Jan. 5, 2024.

* cited by examiner

RESIN CONTAINER MANUFACTURING APPARATUS, TEMPERATURE ADJUSTING DEVICE, RESIN CONTAINER MANUFACTURING METHOD, AND TEMPERATURE ADJUSTING METHOD

CROSS-REFERENCE TO RELATED APPLICATIONS

This is a continuation of U.S. patent application Ser. No. 17/426,739, filed Jul. 29, 2021, which is a U.S. National Phase entry of International Application No. PCT/JP2020/003644, filed Jan. 31, 2020, which claims the benefit of priority to Japanese Patent Application No. 2019-015990, filed Jan. 31, 2019, Japanese Patent Application No. 2019-074204, filed Apr. 9, 2019, and Japanese Patent Application No. 2019-178507, filed Sep. 30, 2019. The disclosure of each of the above-mentioned documents, including the specification, drawings, and claims, is incorporated herein by reference in its entirety.

TECHNICAL FIELD

The present invention relates to a resin container manufacturing apparatus, a temperature adjusting device, a resin container manufacturing method, and a temperature adjusting method by a hot parison type blow molding method. Specifically, the present invention relates to a resin container manufacturing apparatus, a temperature adjusting device, a resin container manufacturing method, and a temperature adjusting method by a hot parison type blow molding method, which enable a resin container having good appearance and good physical properties to be manufactured even if a manufacturing time is shortened.

BACKGROUND ART

The related art discloses a blow molding apparatus including an injection molding station configured to injection-mold a preform, a temperature adjustment station configured to adjust a temperature of the preform molded in the injection molding station, and a blow molding station configured to blow-mold the preform whose temperature has been adjusted in the temperature adjustment station (for example, refer to Patent Literature 1). This type of the blow molding apparatus is an apparatus where the temperature adjustment station is added to a conventional blow molding apparatus (for example, refer to Patent Literature 2) mainly including only the injection molding station and the blow molding station. The preform immediately after molded in the injection molding station does not have a temperature distribution suitable for blow molding. Therefore, the temperature adjustment station capable of more positively adjusting a temperature of the preform is provided between the injection molding station and the blow molding station, such that the temperature of the preform can be adjusted to a temperature suitable for blow molding. Note that, the temperature adjustment station uses a heating pot mold (heating block) and a heating rod, and adjusts the temperature of the preform by heating the preform in a non-contact manner.

In addition, there is a temperature adjusting method that is used when blow-molding a container configured to accommodate cosmetics or the like, where only a bottom portion is thickened. Specifically, suggested is a blow molding apparatus including a temperature adjustment station for performing temperature adjustment for a preform of the container so as to provide a temperature distribution suitable for blow molding. Outer peripheral surfaces of a bottom portion of the preform and a lower body portion continuous to the bottom portion are mechanically closely contacted and securely cooled with a cooling pot, and a body portion except the lower body portion continuous to the bottom portion is heated to a predetermined temperature by the heating block. Accordingly, a container including a bottom portion having a desired thickness and a body portion having a wall portion stretched in a uniform and thin thickness when performing blow molding is manufactured (for example, refer to Patent Literature 3).

In addition, suggested is a blow molding apparatus configured to shorten an injection molding time (specifically, a cooling time) that determines a molding cycle time by cooling a preform in the injection molding station and further cooling the preform in the temperature adjustment station (for example, refer to Patent Literature 4).

CITATION LIST

Patent Literature

Patent Literature 1: JP-A-H06-315973
Patent Literature 2: WO2017/098673
Patent Literature 3: WO2013/012067
Patent Literature 4: JP-A-H05-185493

SUMMARY OF INVENTION

Technical Problem

However, according to the blow molding apparatus of the related art, when the cooling time after injection molding is set short, it is not possible to sufficiently remove temperature unevenness or equalize the temperature in the temperature adjustment station. Therefore, a method capable of manufacturing a high-quality container where thickness unevenness and whitening (cloudiness: which occurs when a thermoplastic resin such as PET (polyethylene terephthalate), which is likely to crystallize during blow molding, is used as a material) are favorably suppressed has not been established.

Further, since the injection-molded preform is conveyed while a neck mold holds a neck portion, the neck portion is excessively cooled.

An object of the present invention is to provide a resin container manufacturing apparatus, a temperature adjustment station, a resin container manufacturing method, and a temperature adjusting method, which enable a resin container of good quality to be manufactured even by a hot parison type injection blow molding method where a molding cycle time is shortened.

Solution to Problem

The present invention provides a resin container manufacturing apparatus configured to injection-mold a preform, to adjust a temperature of the injection-molded preform in a temperature adjustment station, and to blow-mold the temperature-adjusted preform, in which the temperature adjustment station has a multistage structure where an uppermost stage has the highest temperature, and a mold surface temperature of a lower stage other than the uppermost stage is lower than a glass transition temperature of the preform by 10° C. or more.

In this case, the mold surface temperature of the lower stage may be equal to or higher than 30° C. and equal to or lower than 80° C. in a case where a thickness of the preform is equal to or greater than 1.5 mm and equal to or smaller than 3.0 mm. The mold surface temperature of the lower stage may be equal to or higher than 10° C. and equal to or lower than 60° C. in a case where a thickness of the preform is equal to or greater than 3.0 mm and equal to or smaller than 5.0 mm. The temperature adjustment station may be configured to sandwich and compressively deform the preform with a temperature adjustment core mold and a temperature adjustment cavity mold. The temperature adjustment station may be configured to circulate air inside the preform.

The present invention provides a resin container manufacturing method including injection-molding a preform, adjusting a temperature of the injection-molded preform in a temperature adjustment station, and blow-molding the temperature-adjusted preform, in which the temperature adjustment station has a multistage structure where an uppermost stage has the highest temperature, and a mold surface temperature of a lower stage other than the uppermost stage is lower than a glass transition temperature of the preform by 10° C. or more.

The present invention provides a temperature adjusting method to be used for blow molding of a preform, the method including adjusting a temperature of a temperature adjusting device having a multistage structure such that an uppermost stage has the highest temperature, and adjusting a temperature of the preform in a state where a mold surface temperature of a lower stage other than the uppermost stage is lower than a glass transition temperature of the preform by 10° C. or more.

The present invention provides a resin container manufacturing apparatus including: an injection molding station configured to injection-mold a preform: a temperature adjustment station configured to adjust a temperature of the injection-molded preform: and a blow molding station configured to blow-mold the temperature-adjusted preform, in which the injection molding station includes an injection core mold, an injection cavity mold and a neck mold that define a molding space of the preform, a time for cooling the preform in the molding space is ⅔ or less of a time for injecting a resin material, which is to be molded into the preform, into the molding space, the temperature adjustment station includes a temperature adjustment pot of a multistage structure constituted by a plurality of stages aligned in an upper and lower direction and capable of independently setting a temperature for each stage, and the temperature adjustment pot is configured to cool the preform at different temperatures along the upper and lower direction while being in contact with an outer surface of the preform.

In this case, the temperature adjustment station may be configured to sandwich and cool the preform with a temperature adjustment core mold and a temperature adjustment cavity mold. The temperature adjustment station may be configured to circulate air inside the preform. A temperature of a stage close to a portion for causing air to flow into an inside of the preform may be set to be higher than a temperature of a stage for causing the air to flow out. The temperature adjustment pot may be configured to come into contact with a body portion and a bottom portion of the preform on an accommodation surface formed as one surface without a boundary, and the temperature adjustment pot may have, on an outer side thereof, groove portion between the stages.

The present invention provides a resin container manufacturing method including injection-molding a preform in an injection molding station, adjusting a temperature of the injection-molded preform in a temperature adjustment station, and blow-molding the temperature-adjusted preform in a blow molding station, in which the injection molding station includes an injection core mold, an injection cavity mold and a neck mold that defines a molding space of the preform, a time for cooling the preform in the molding space is ⅔ or less of a time for injecting a resin material, which is to be molded into the preform, into the molding space, the temperature adjustment station includes a temperature adjustment pot having a multistage structure constituted by a plurality of stages aligned in an upper and lower direction, and capable of independently setting a temperature for each stage, and the temperature adjustment pot is configured to cool the preform at different temperatures along the upper and lower direction while being in contact with an outer surface of the preform.

Advantageous Effects of Invention

According to the present invention, it is possible to provide the resin container manufacturing apparatus, the temperature adjustment station, the resin container manufacturing method, and the temperature adjusting method which enable a resin container of good quality to be manufactured even by a hot parison type injection blow molding method where a molding cycle time is shortened.

DESCRIPTION OF EMBODIMENTS

Hereinafter, favorable embodiments of the present invention will be described with reference to the drawings.

First Embodiment

Figure 1:
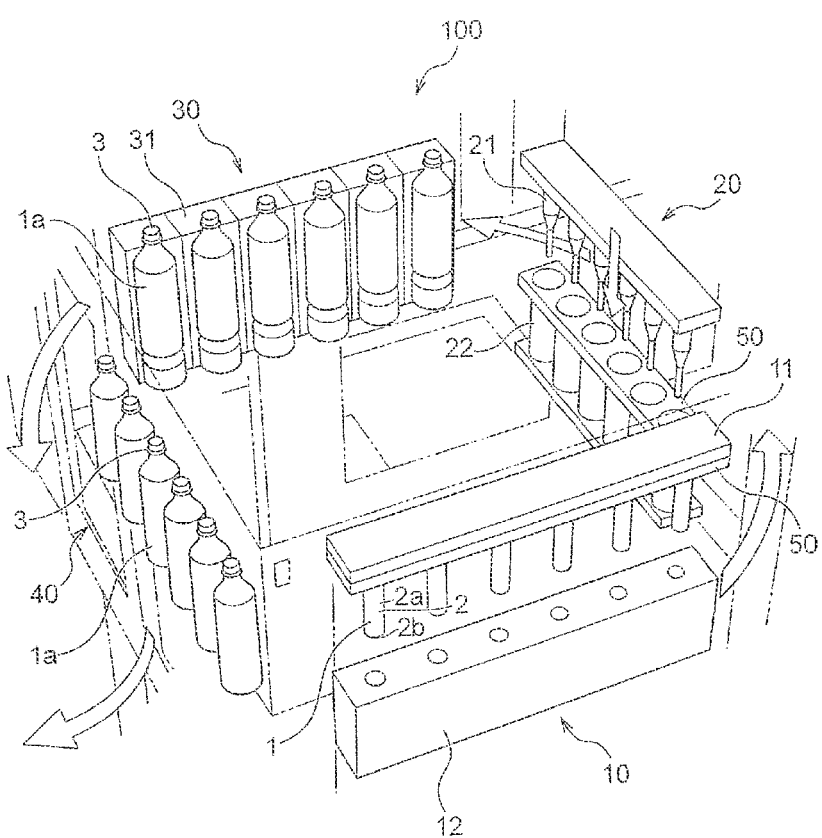
FIG. 1 is a perspective view of a blow molding apparatus (which includes an injection molding station, a temperature adjustment station, a blow molding station and a take-out station) according to a first embodiment of the present invention.
Figure 2:
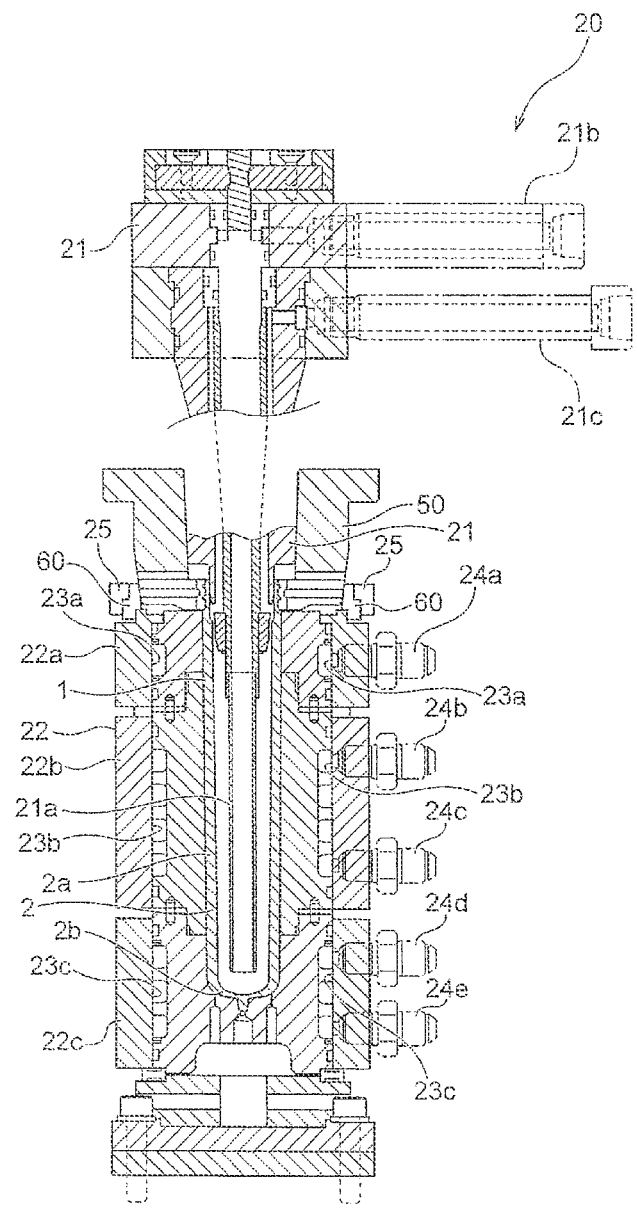
FIG. 2 is a cross-sectional view of the temperature adjustment station, as seen from the front.

FIG. 1 is a perspective view of a blow molding apparatus (including an injection molding station, a temperature adjustment station, a blow molding station and a take-out station) according to a first embodiment of the present invention, and FIG. 2 is a cross-sectional view of the temperature adjustment station, as seen from the front.

As shown in FIG. 1, a blow molding apparatus (a resin container manufacturing apparatus) 100 includes an injection molding station 10, a temperature adjustment station (temperature adjusting device) 20, a blow molding station 30, and a take-out station 40, and manufactures a container 1a by injection-molding a preform 1 and then blow-molding the preform.

The injection molding station 10, the temperature adjustment station 20, the blow molding station 30 and the take-out station 40 are arranged in alignment of forming four sides of a square, as seen from above. A rotation plate (not shown) provided with a neck mold 50 (conveying section) configured to hold a neck portion 3 of the preform 1 molded in the injection molding station 10 is provided above these stations. Four sets of neck molds 50 are arranged in alignment of forming four sides of the square on the rotation plate, as seen from above. Thereby, when the rotation plate is rotated about a vertical shaft in a counterclockwise direction by 90 degrees above the injection molding station 10, the temperature adjustment station 20, the blow molding station 30 and the take-out station 40, each of the four sets of the neck molds 50 sequentially moves to the injection molding station 10, the temperature adjustment station 20, the blow molding station 30 and the take-out station 40 with the same time, so that each step is performed for the preform 1 held with the neck mold 50 for the same time.

The injection molding station 10 includes an injection core mold 11, an injection cavity mold 12 and an injection device (not shown), and injection-molds the preform 1.

The preform 1 includes a neck portion 3 on a release side and a storage portion 2 (main body portion) 2 on a closed side, and is formed in a bottomed shape (bottomed hollow shape). The preform 1 is blow molded to be a container 1a, and has a shape having a thick thickness, which is obtained by shrinking the blow-molded container 1a in an upper and lower direction in FIG. 1. The storage portion 2 is constituted by a body portion 2a continuing to the neck portion 3 on the release side, and a bottom portion 2b positioned on the closed side and continuing to the body portion 2a.

When injection-molding the preform 1, the injection core mold 11, the injection cavity mold 12 and the neck mold 50 are combined to define a space corresponding to the preform 1. At this time, inner surface shapes of the storage portion 2 and neck portion 3 of the preform 1 are formed by the injection core mold 11, an outer surface shape of the storage portion 2 is formed by the injection cavity mold 12, and an outer surface shape of the neck portion 3 is formed by the neck mold 50. The injection core mold 11 and the injection cavity mold 12 are each formed with a flow path (not shown) connected to a chiller and through which a low-temperature (for example, 5° C. or higher and 20° C. or lower) coolant circulates.

The injection molding station 10 heats and melts a material such as a thermoplastic synthetic resin (for example, a polyester-based resin such as PET (polyethylene terephthalate)) at a high temperature. The injection device (not shown) of the injection molding station 10 injects and fills the melted material into a molding space (cavity) defined by the injection core mold 11, the injection cavity mold 12 and neck mold 50. The injection molding station 10 cools a portion of the injected material that is close to a mold surface (cavity surface) to a temperature, for example, 20° C., which is lower than a melting point (for example, about 255° C. in the case of PET), and solidifies the portion of the injected material to form a surface layer (skin layer) on the storage portion 2 and to mold the preform 1. At this time, an inner layer (core layer) of the storage portion 2 of the preform 1 is maintained at a temperature (for example, 150° C. to 20° C.) equal to or lower than the melting point and equal to or higher than a glass transition temperature, and the storage portion 2 has an amount of heat enough to be stretched in the blow molding station 30. Note that, in the present invention, a molding cycle time, i.e., a molding time of the preform 1 is shortened, as compared to the related art. Specifically, out of an injection time (filling time) and a cooling time which relate to the injection molding time of the preform, the cooling time is set considerably shorter than the related art. For example, the cooling time for cooling preform 1 in the molding space is ⅔ or less, preferably ½ or less, and more preferably ⅓ or less of the injection time for injecting a resin material, which is to be molded into the preform, into the molding space.

The injection core mold 11 is formed such that a traverse section of a portion corresponding to the storage portion 2 (more specifically, the body portion 2a) of the preform 1 is smaller than a traverse section of a portion corresponding to the neck portion 3. Thereby, an inside of the injection-molded preform 1 is formed such that an internal space area in a direction perpendicular to an axis center Z of the preform 1 adjacent to the storage portion 2 is smaller than an internal space area adjacent to the neck portion 3.

In addition, the injection core mold 11 is formed such that a traverse section becomes gradually smaller toward a position on the mold surface (cavity surface) corresponding to the bottom portion 2b of the preform 1. Thereby, the inside of the injection-molded preform 1 is formed such that the internal space area expanding in the direction perpendicular to the axis center Z of the preform 1 becomes gradually smaller toward the bottom portion 2b of the preform 1.

The preform 1 solidified to some extent (a degree that a skin layer is formed on inner and outer surfaces of the storage portion 2 and an outer shape can be thus maintained) after injection-molded in the injection molding station 10 is raised above together with the rotation plate with being held on the neck mold 50, is pulled out (demolded) from the injection core mold 11 and the injection cavity mold 12, and is conveyed to the temperature adjustment station 20 as the rotation plate is rotated in the counterclockwise direction by 90 degrees, as seen from above. Since the preform 1 is demolded from the injection molding station 10 at a higher temperature than the related art, the surface layer of the storage portion 2 is formed thin but the inner layer is formed thick, so the higher residual heat than the related art is maintained.

The temperature adjustment station 20 is arranged next to the injection molding station 10, and as shown in FIG. 2, includes a hollow pipe-shaped temperature adjustment rod (cooling rod) 21a, a blow core 21 for temperature adjustment, and a temperature adjustment pot 22.

When the preform 1 made of a crystalline thermoplastic resin such as PET is slowly cooled to a temperature zone (for example, about 120° C. to 200° C. in which crystallization is promoted, whitening (cloudiness) due to crystallization is caused. Accordingly, in order to manufacture the highly clear container 1a, it is necessary to rapidly cool the preform 1 injection-molded in the injection molding station 10 to the crystallization temperature zone or lower.

The preform 1 conveyed from the injection molding station 10 is moved down together with the rotation plate until the neck mold 50 comes in contact with a centering ring 60 attached on the temperature adjustment pot 22, and is inserted into the temperature adjustment pot 22. When the preform 1 is inserted in the temperature adjustment pot 22, the temperature adjustment rod 21a is inserted into the preform 1 through an opening formed on the neck portion 3 of the preform 1. In addition, the blow core 21 for temperature adjustment is fitted or contacted to an inner peripheral surface or an upper end surface of the opening of the neck portion 3. Note that, after the temperature adjustment rod 21a is inserted in the preform 1, the preform 1 may be inserted into the temperature adjustment pot 22 together with the temperature adjustment rod 21a.

The temperature adjustment rod 21a has one end formed to have a cylindrical shape and configured to be inserted into the temperature adjustment pot 22, and the other end having a first connection portion 21b for connection to a compressor (not shown) and a second connection portion 21c for connection to the atmosphere via a tube or the like (not shown). Thereby, in a state where the temperature adjustment rod 21a is inserted in the preform 1 arranged in the temperature adjustment pot 22 and the temperature adjustment core 21 is fitted, the compressed air (cooling air) pneumatically transported from the compressor passes through an inside of the temperature adjustment rod 21a or an inside of the cylindrical part of the temperature adjustment core 21 and is ejected into the preform 1. The ejected compressed air passes between the periphery of the cylindrical part and the inner surface of the preform 1, or passes through the temperature adjustment rod 21a to be discharged to an outside from the connection portion 21c via the tube or the like. Thereby, the body portion 2b can be cooled from the inner surface-side of the preform 1.

The temperature adjustment pot 22 has a multistage structure constituted by a plurality of stages (temperature adjustment blocks) aligned in the upper and lower direction. In the present embodiment, the temperature adjustment pot 22 includes a first stage (first temperature adjustment block) 22a, a second stage (second temperature adjustment block) 22b and a third stage (third temperature adjustment block) 22c. The first stage 22a includes a flow path 23a, a connection portion 24a that connects the flow path 23a to a mold temperature adjustment machine (temperature adjustment machine) to allow a temperature adjustment medium (coolant) at a predetermined temperature to flow into the flow path 23a, and a connection portion (not shown) that is arranged next to the connection portion 24a and that connects the flow path 23a to the temperature adjustment machine to allow the coolant to flow out, similar to the connection portion 24a. The coolant flowing from the connection portion 24a circulates around the preform 1 in the temperature adjustment pot 22 and flows out from the connection portion (not shown). The second stage 22b includes a flow path 23b, a connection portion 24b that connects the flow path 23b to the temperature adjustment machine to allow the coolant to flow into the flow path 23b, a connection portion 24c that is arranged below the connection portion 24b and that connects the flow path 23b to the temperature adjustment machine to allow the coolant to flow out, similar to the connection portion 24b. The coolant flowing from the connection portion 24b circulates around the preform 1 in the temperature adjustment pot 22 and flows out from the connection portion 24c. The third stage 22c includes a flow path 23c, a connection portion 24d that connects the flow path 23c to the temperature adjustment machine to allow the coolant to flow into the flow path 23c, a connection portion 24e that is arranged below the connection portion 24d and that connects the flow path 23c to the temperature adjustment machine to allow the coolant to flow out, similar to the connection portion 24d. The coolant flowing from the connection portion 24d circulates around the preform 1 in the temperature adjustment pot 22 and flows out from the connection portion 24e. The temperature adjustment pot 22 is configured to cool (temperature-adjust) the preform 1 to different temperatures along the upper and lower direction (longitudinal axis direction, vertical direction), and may include at least two stages of the first stage 22a and the second stage 22b.

The compressed air flowing in the preform 1 absorbs heat of the body portion 2a until it is discharged from the preform 1, and the temperature of the air rises. Therefore, the temperature of the air inflowing to the preform is usually lower than the temperature of the air outflowing from the preform 1. Accordingly, for example, in a case where the compressed air flows into the preform 1 from an outer side of the temperature adjustment rod 21a and circulates the inner side of the temperature adjustment rod 21a from a tip end of the temperature adjustment rod 21a to flow out to an outside of the temperature adjustment rod 21a, a portion of the body portion 2a adjacent to the neck portion 3 is strongly cooled, so that it may be excessively cooled beyond necessity. In contrast, in a case where the compressed air flows into the preform 1 from a tip end of the temperature adjustment rod 21a to flow out to the outside of the preform 1 from the outer side of the temperature adjustment rod 21a, a portion of the body portion 2a adjacent to the bottom portion 2b is strongly cooled, so that it may be excessively cooled beyond necessity. In order to reduce this and equally cool the preform 1, the stage adjacent to the inflow portion of the compressed air is preferably set to a higher temperature than the stage adjacent to the outflow portion. That is, in a case where the compressed air flows into the preform 1 from the outer side of the temperature adjustment rod 21a, the temperature of the first stage 22a is set higher than the temperature of the third stage 22c, and in a case where the compressed air flows into the preform 1 from the tip end of the temperature adjustment rod 21a, the temperature of the third stage 22c is set higher than the temperature of the first stage 22a.

Since the flow paths 23a, 23b and 23c are formed independently of each other, the stages 22a, 22b and 22c can be each set at different temperatures by circulating the coolant (temperature adjustment medium) of different temperatures in each of the flow paths 23a, 23b and 23c. In the present embodiment, a multistage structure where the uppermost stage has the highest temperature is preferable, and the mold surface temperatures of the first stage 22a that is the uppermost stage and the lower stages 22b and 22c are set lower than the glass transition temperature of the material of the preform 1 by 0° C. or more and 60° C. or less (0° C. to 60° C.). For example, in a case where the preform 1 made of PET whose glass transition temperature is about equal to or higher than 70° C. and equal to or lower than 80° C. is used, the mold surface temperatures of the second stage 22b and the third stage 22c are set to 10° C. or higher and 80° C. or lower, preferably 20° C. or higher and 75° C. or lower, and more preferably; 30° C. or higher and 60° C. or lower. In addition, the mold surface temperature of the first stage 22a that is the uppermost stage is preferably set higher than the lower stages 22b and 22c by 10° C. or higher and 20° C. or lower. Further, the mold surface temperatures of the stages 22a. 22b and 22c are preferably each adjusted to be inversely proportional to the thickness of the preform 1. For example, in a case where the thickness of the preform 1 made of PET is equal to or greater than 1.5 mm and equal to or smaller than 3.0 mm, the mold surface temperature of each of the stages 22b and 22c is preferably set to be equal to or higher than 30° C. and equal to or lower than 80° C., and in a case where the thickness of the preform 1 made of PET is equal to or greater than 3.0 mm and equal to or smaller than 5.0 mm, the mold surface temperature of each of the stages 22b and 22c is preferably set to be equal to or higher than 10° C. and equal to or lower than 60° C.

Since the preform 1 conveyed to the temperature adjustment station 20 is too high in temperature for blow molding, the preform is further cooled in the temperature adjustment station 20 and is thus temperature-adjusted to a temperature suitable for blow molding. At this time, since the metallic neck mold 50) conveys the preform 1 from the injection molding station 10 while holding the neck portion 3 of the preform 1 and the preform 1 is temperature-adjusted in the temperature adjustment station 20, the storage portion 2 adjacent to the neck portion 3 is likely to be excessively cooled, as compared to the other portion. However, the temperature adjustment station 20 sets the mold surface temperature of the first stage 22a, which is the uppermost stage, to be higher than the mold surface temperatures of the lower stages 22b and 22c, so the excessive cooling of a portion of the storage portion 2 adjacent to the neck portion 3 can be prevented. Further, since the mold surface temperatures of the lower stages 22b and 22c are low; a portion of the storage portion 2 that is not adjacent to the neck portion 3 can be securely cooled. As a result, since the preform 1 is more equally cooled in the length direction and has a temperature distribution suitable for blow molding, as a whole, the thickness unevenness of the container 1a that is a final form can be prevented.

The preform 1 temperature-adjusted in the temperature adjustment station 20 is lifted together with the rotation plate with being held on the neck mold 50 and is pulled out from the temperature adjustment pot 22, and is conveyed to the blow molding station 30 as the rotation plate is further rotated in the counterclockwise direction by 90 degrees, as shown in FIG. 1.

As shown in FIG. 1, the blow molding station 30 is arranged next to the temperature adjustment station 20, and includes a blow mold 31 and an air blowing portion (not shown). The blow mold 11 is formed with a flow path (not shown) connected to a chiller and through which a low-temperature (for example, 10° C. or higher and 25° C. or lower) coolant circulates.

The blow mold 31 has a mold surface on an inner side, which corresponds to a shape of the container 1a, and is considerably larger than the temperature adjustment pot 22 of the temperature adjustment station 20.

The air blowing portion is provided so as to fill the air in the preform 1 inserted in the blow mold 31.

When the preform 1 conveyed to the blow molding station 30 is moved down together with the rotation plate and is inserted into the blow mold 31, the air blowing member (blow core for blow molding) is connected to the opening of the neck portion 3 of the preform 1 and the air is blown from the air blowing portion into the preform 1, the storage portion 2 of the preform 1 is inflated until the entire outer surface of the storage portion 2 is closely contacted and pressurized to the mold surface of the blow mold 31, as shown in FIG. 1, so that the container 1a is molded.

The preform 1 blow-molded in the blow molding station 30 is lifted together with the rotation plate with being held on the neck mold 50, is pulled out from the blow mold 31 and is conveyed to the take-out station 40 as the rotation plate is further rotated in the counterclockwise direction by 90 degrees, as shown in FIG. 1.

As shown in FIG. 1, the take-out station 40 is arranged between the blow molding station 30 and the injection molding station 10. In the take-out station 40, the neck mold 50 is opened, so that the container 1a is not held any more. As a result, the container 1a is dropped, so that the container 1a is taken out (demolded) from the blow molding apparatus 100.

In the below, a test result is described in which it is tested as to whether there is a cause-and-effect relationship between the mold surface temperature of the temperature adjustment pot 22 and the transparency of the container 1a by stepwise changing the mold surface temperature of each of the stages 22a, 22b and 22c of the temperature adjustment pot 22 and observing the appearance of the container 1a molded via each step.

Here, the mold surface temperature of the temperature adjustment pot 22 is set to three following conditions.

First condition: the first stage: 30° C., the second stage: 20° C. and the third stage: 20° C.

Second condition: the first stage: 50° C., the second stage: 40° C. and the third stage: 40° C.

Third condition: the first stage: 70° C., the second stage: 60° C. and the third stage: 60° C.

The molding conditions are as follows.

The molding cycle time is 15.0 seconds. In the injection molding station, the injection time (filling time) is 9.2 seconds and the cooling time is 1.8 seconds. In the blow molding station, the coolant temperature of the chiller of the blow mold is 15° C. and the blow molding time is 7 seconds. Regarding the preform, material is PET, the weight is about 73 g, and the average thickness of the body portion 2b is about 4.2 mm. Regarding the container, filling capacity is 750 ml. The average stretch ratio in lateral direction is 3.18 and average stretch ratio in the longitudinal direction is 1.37.

As a result, it is confirmed that as the condition is changed from first condition to third condition, i.e., as the mold surface temperature of the temperature adjustment pot 22 increases from a low state to a high state, the container 1a is further whitened and the transparency is lowered when the container 1a is irradiated with light.

The outer surface temperature of the preform 1 is measured at a timing immediately before the preform is blow-molded under each condition, and the highest temperature of the outer surface temperature of the preform 1 immediately before the blow molding is compared as follows.

First condition: 73.07° C.

Second condition: 81.15° C.

Third condition: 91.24° C.

There is a large difference as to the outer surface temperature of the preform 1 according to the conditions, and when comparing the outer surface temperatures under first condition and third condition, there is a temperature difference of about 20° C. Particularly, under first condition, the maximum temperature is only about 73° C., which may affect the shapability during blow molding. Therefore, the full-filling capacity (an amount that water is fully filled up to an upper end of the neck portion 8) is compared between first condition and third condition. The target full-filling capacity is 888 ml, and the full-filling capacity is 885.0 ml under first condition and 885.1 ml under third condition. That is, there is little difference as to the full-filling capacity. As for the shape, there is no problem within the comparison range by naked eyes. Note that, the blow pressure during blow molding is 2.0 MPa at a secondary.

From the above results, it can be seen that, when the preform 1 is not cooled so much as in the injection molding station 10 of the present embodiment (when the cooling time after the filling time in the injection molding step is shortened, i.e., when the preform is demolded at a high temperature), it is also effective to lower the mold surface temperature of the temperature adjustment pot 22 so as to prevent crystallization of the preform 1.

The blow molding apparatus 100 of the present embodiment includes the temperature adjustment station 20 having the multistage structure where the first stage 22a, which is the uppermost stage, has the highest temperature, and the mold surface temperatures of the lower stages 22b and 22c other than the first stage 22, which is the uppermost stage, are lower than the glass transition temperature of the preform 1 by 10° C. or more. Thereby, since it is possible to prevent the preform 1 from being excessively cooled near the neck portion 3 by the neck mold 50, it is possible to manufacture a container of good quality even by the hot parison type injection blow molding method in which the molding cycle time is shortened.

Second Embodiment

Figure 3:
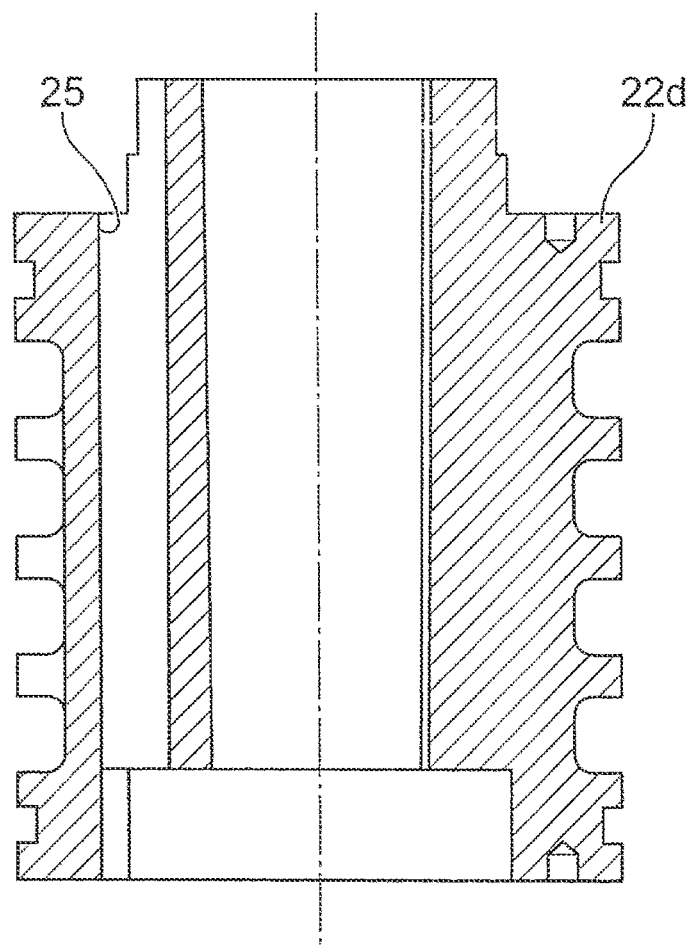
FIG. 3 is a cross-sectional view of a second stage according to a second embodiment.
Figure 4A:
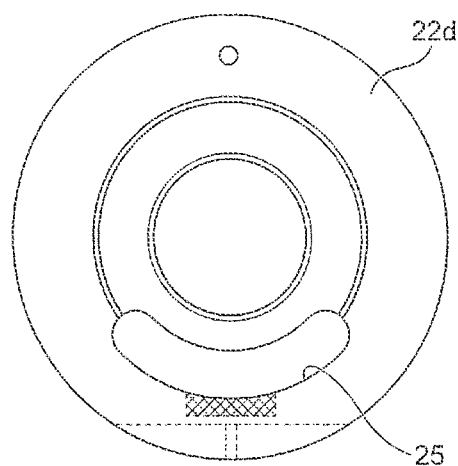
FIG. 4(*a*) is a top view and FIG. 4(*b*) is a bottom view of the second stage according to the second embodiment.
Figure 4B:
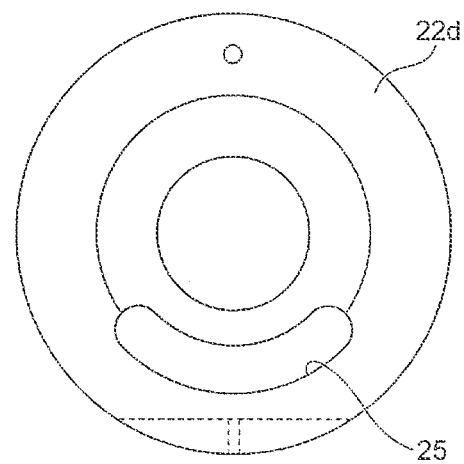
Figure 5:
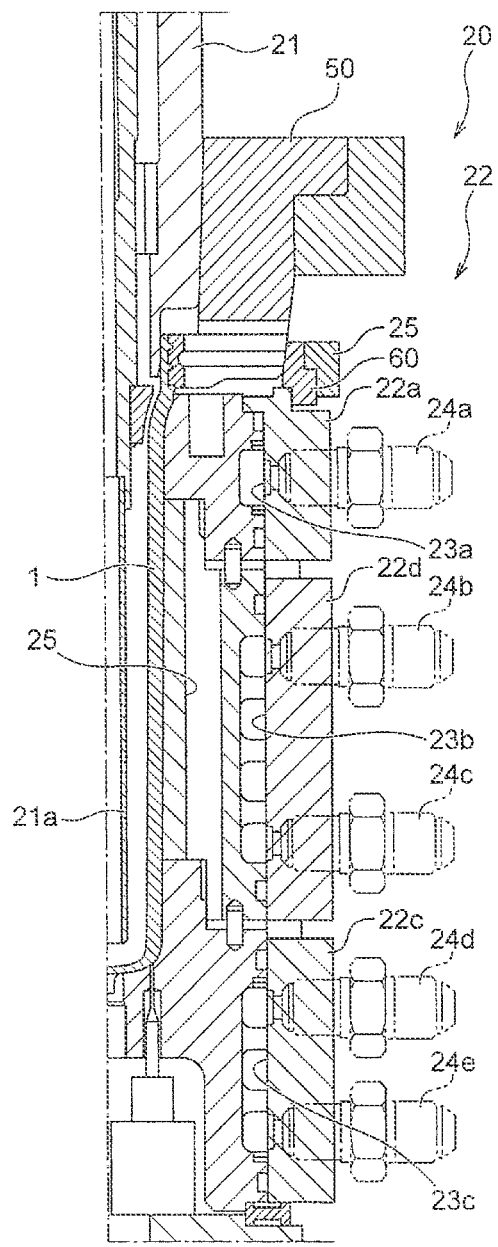
FIG. 5 is a cross-sectional view of a temperature adjustment station according to the second embodiment.

FIG. 3 is a cross-sectional view of the second stage, FIG. 4 is a top view and a bottom view of the second stage, and FIG. 5 is a cross-sectional view of the temperature adjustment station, as seen from the front. Section (a) in FIG. 4 is a top view of a second stage 22d, and section (b) in FIG. 4 is a bottom view of the second stage 22d. Note that, in the second embodiment, parts different from the first embodiment are described, and the configurations in the drawings, which are substantially the same as the first embodiment, are denoted with the same reference signs.

In the present embodiment, the second stage 22d is inserted into the temperature adjustment pot 22 and corresponds to the body portion 2a of the preform 1, and as shown in FIG. 3, is formed with a hollow portion 25 extending along a direction in which the preform 1 is inserted. As shown in section (a) in FIG. 4, the hollow portion 25 is formed by removing a portion of the second stage 22d into an arc shape whose center is an axis of the second stage 22d, i.e., an axis of the temperature adjustment pot 22. The hollow portion 25 is arranged on a more inner side (axis-side) than the flow path 23b. The hollow portion 25 is straightly removed along an axis center direction of the temperature adjustment pot 22 to penetrate from an upper surface-side to a bottom surface-side of the second stage 22d, and as shown in section (b) in FIG. 4, is formed as a hole penetrating in the same arc shape as the upper surface-side, when seeing the second stage 22d from a bottom surface-side of the temperature adjustment pot 22. Thereby, as shown in FIG. 5, when incorporating the second stage 22d into the temperature adjustment pot 22 to adjust the temperature of the preform 1, a portion at which the hollow portion 25 becoming an air layer (insulation layer) is formed can be set to a lower temperature than a portion at which the hollow portion 25 is not formed. For this reason, when the second stage 22d is rotated with respect to the temperature adjustment pot 22 about the axis center Z of the preform 1, according to the temperature distribution of the preform 1, the position adjustment is made so that the high-temperature portion of the preform 1 is contacted to the portion at which the hollow portion 25 is formed. Therefore, it is possible to eliminate the unfavorable temperature unevenness in circumferential positions of the preform.

Third Embodiment

Figure 6:
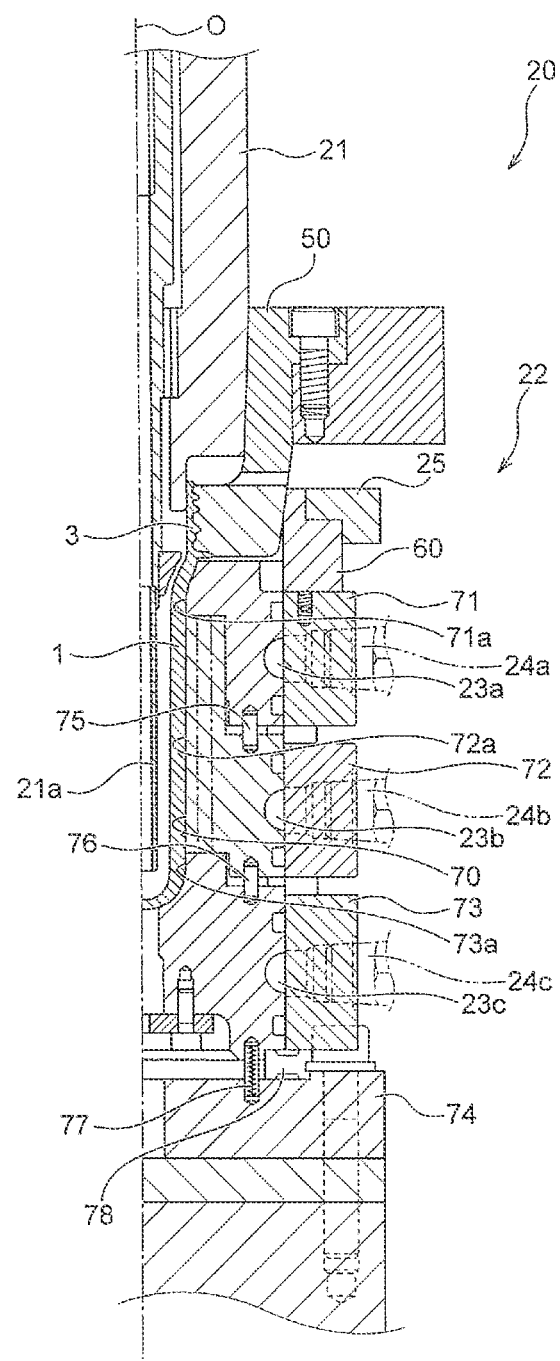
FIG. 6 is a cross-sectional view of a half of a temperature adjustment station according to a third embodiment, as seen from the front.
Figure 7C:
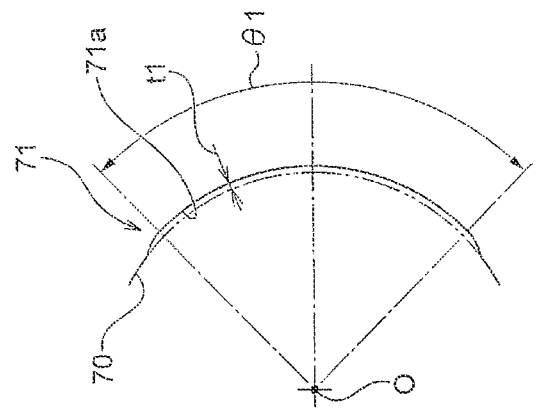
FIGS. 7(*a*), 7(*b*), and 7(*c*) show a first stage of the temperature adjustment station according to the third embodiment.
Figure 7B:
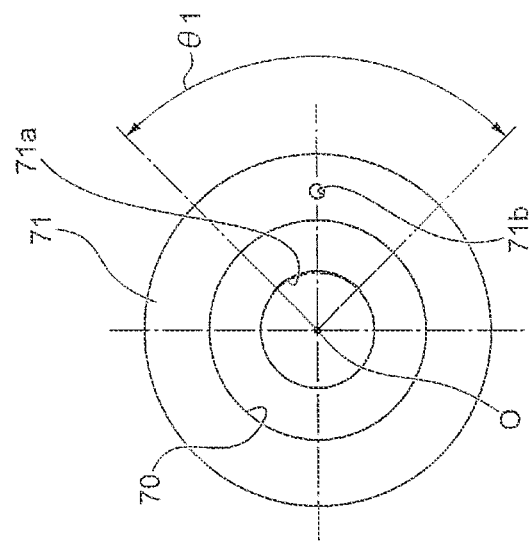
Figure 7A:
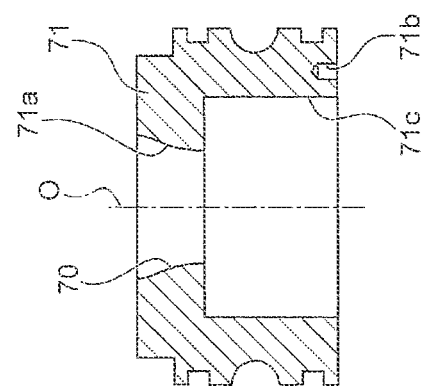
Figure 8:
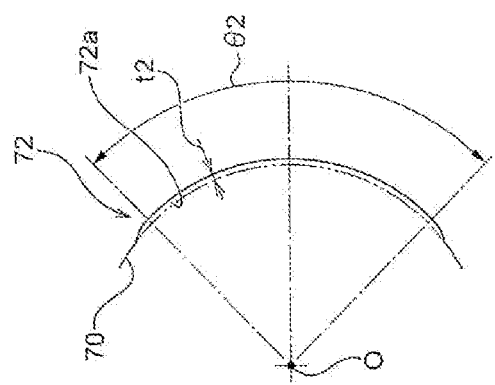
FIGS. 8(*a*), 8(*b*), and 8(*c*) show a second stage of the temperature adjustment station according to the third embodiment.
Figure 8:
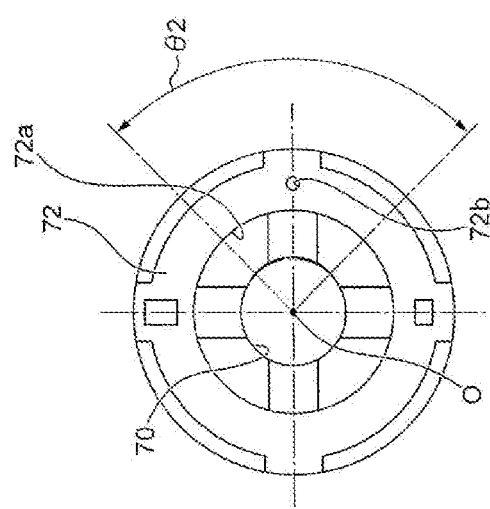
Figure 8:
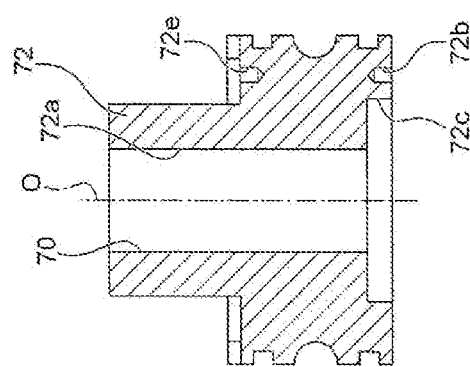
Figure 9A:
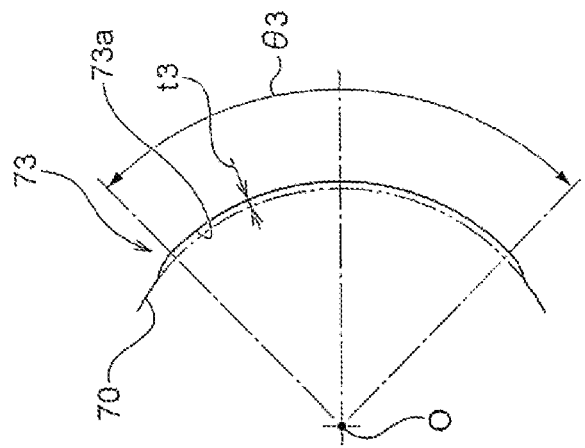
FIGS. 9(*a*), 9(*b*), and 9(*c*) show a third stage of the temperature adjustment station according to the third embodiment.
Figure 9B:
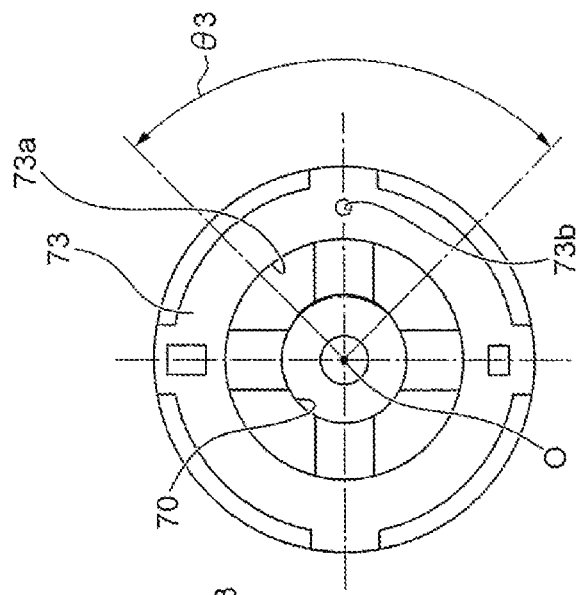
Figure 9C:
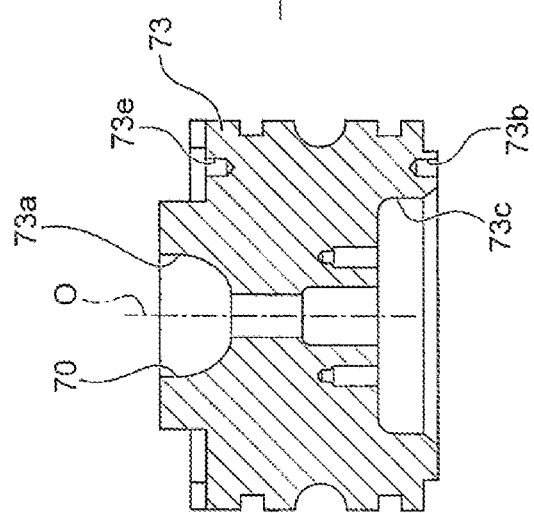
Figure 10:
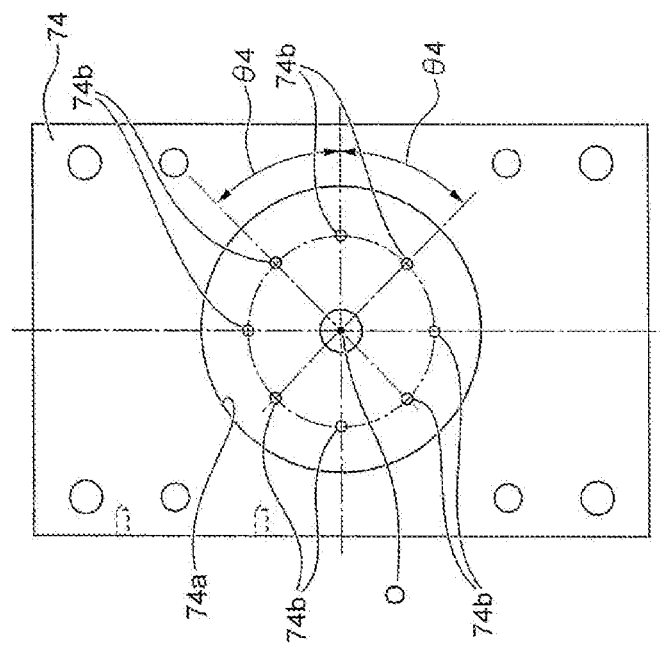
FIGS. 10(*a*) and 10(*b*) show a fixing plate of the temperature adjustment station according to the third embodiment.
Figure 10:
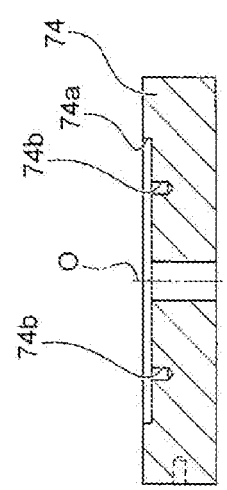

FIG. 6 is a cross-sectional view of a half of a temperature adjustment station according to a third embodiment, FIG. 7 shows a first stage of the temperature adjustment station, FIG. 8 shows a second stage of the temperature adjustment station, FIG. 9 shows a third stage of the temperature adjustment station, and FIG. 10 shows a fixing plate of the temperature adjustment station.

Section (a) in FIG. 7 is a cross-sectional view of the first stage, section (b) in FIG. 7 is a bottom view of the first stage, and section (c) in FIG. 7 is a partially enlarged view of the bottom view: Section (a) in FIG. 8 is a cross-sectional view of the second stage, section (b) in FIG. 8 is a bottom view of the second stage, and section (c) in FIG. 8 is a partially enlarged view of the bottom view: Section (a) in FIG. 9 is a cross-sectional view of the third stage, section (b) in FIG. 9 is a bottom view of the third stage, and section (c) in FIG. 9 is a partially enlarged view of the bottom view: Section (a) in FIG. 10 is a cross-sectional view of the fixing plate, and section (b) in FIG. 10 is a top view of the fixing plate. Note that, in the third embodiment, parts different from the first embodiment are described, and the configurations in the drawings, which are substantially the same as the first embodiment, are denoted with the same reference signs.

As shown in FIG. 6, the temperature adjustment station 20 of the present embodiment includes a first stage 71, a second stage 72, a third stage 73 and a fixing plate 74. A shape of a portion of the accommodation surface 70 on which the first stage 71, the second stage 72 and the third stage 73 accommodate the preform 1, and a configuration of the fixing plate 74 are different from the temperature adjustment station 20 of the first embodiment.

As shown in section (a) in FIG. 7, the first stage 71 has a cylindrical shape, and an inner diameter is narrowed at an upper end. An inner periphery of the upper end of the first stage 71 is formed with a portion of the accommodation surface 70 for accommodating the preform 1. A lower end of the first stage 71 is formed with a pin hole 71b for positioning with respect to the second stage 72 and a hole 71c for insertion of an upper portion of the second stage 72.

As shown in section (b) in FIG. 7, the first stage 71 is formed with a diameter-enlarged surface 71a such that a portion of the accommodation surface 70 is enlarged in diameter. The diameter-enlarged surface 71a is formed within a range of a substantial angle θ1 about an axis center O of the substantially circular accommodation surface 70. The pin hole 71b is positioned at a substantial center of the range of the angle θ1 in which the diameter-enlarged surface 71a is formed.

As shown in the enlarged view of section (c) in FIG. 7, the diameter-enlarged surface 71a is formed by recessing a portion of the inner peripheral surface of the upper end of the first stage 71 forming a portion of the accommodation surface 70. The range of the angle θ1 in which the diameter-enlarged surface 71a is formed as a diameter is equally enlarged in a radial direction by a thickness t1 within the range of the angle θ1 about the axis center O of the accommodation surface 70. An outside of the range of the angle θ1 is gradually reduced in inner diameter and is gradually connected to a surface of a non-recessed portion of the accommodation surface 70. The angle θ1 is within a range of 50° to 110°, preferably 80° to 100°, and is more preferably 90° about the axis center O of the accommodation surface. The thickness t1 is equal to or greater than 0.2 mm and equal to or smaller than 0.5 mm, and is preferably 0.3±0.1 mm.

As shown in section (a) in FIG. 8, the second stage 72 is narrowed in outer diameter at an upper portion, and therefore, has a cylindrical shape where the upper and lower portions have different outer diameters. An inner periphery of the second stage 72 is formed with a portion of the accommodation surface 70 for accommodating the preform 2. A lower end of the second stage 72 is formed with a pin hole 72b for positioning with respect to the third stage 73 and a hole 72c for insertion of an upper portion of the third stage 73. In addition, the lower portion of the second stage 72 is formed with a pin hole 72e for positioning with respect to the first stage 71, on a surface formed back-to-back and parallel to a lower end surface on which the pin hole 72b is formed. Thereby, by interposing a pin 75 (refer to FIG. 6) between the pin hole 71b of the first stage 71 and the pin hole 72e of the second stage 72 while matching the positions of the pin holes, the circumferential positions about the axis center O of the accommodation surface 70 can be fixed with respect to the first stage 71 and the second stage 72.

As shown in section (b) in FIG. 8, the second stage 72 is formed with a diameter-enlarged surface 72a such that a portion of the accommodation surface 70 is enlarged in diameter. The diameter-enlarged surface 72a is formed within a range of a substantial angle θ2 about the axis center O of the substantially circular accommodation surface 70. The pin hole 72b is positioned at a substantial center of the range of the angle θ2 in which the diameter-enlarged surface 72a is formed.

As shown in the enlarged view of section (c) in FIG. 8, the diameter-enlarged surface 72a is formed by recessing a portion of the inner peripheral surface of the second stage 72 forming a portion of the accommodation surface 70. The range of the angle θ2 in which the diameter-enlarged surface 72a is formed as a diameter is equally enlarged in a radial direction by a thickness t2 within the range of the angle θ2 about the axis center O of the accommodation surface 70. An outside of the range of the angle θ2 is gradually reduced in inner diameter and is gradually connected to a surface of a non-recessed portion of the accommodation surface 70. The angle θ2 is within a range of 50° to 110°, preferably 80° to 100°, and is more preferably 90° about the axis center O of the accommodation surface 70. The thickness t2 is equal to or greater than 0.2 mm and equal to or smaller than 0.5 mm, and is preferably 0.3 mm.

As shown in section (a) in FIG. 9, the third stage 73 is narrowed in outer diameter at an upper portion, and therefore, has a cylindrical shape where the upper portion and the other portion have different outer diameters. An inner periphery of the second stage 73 is formed with a portion of the accommodation surface 70 for accommodating the preform 3. A lower end of the third stage 73 is formed with a pin hole 73b for positioning with respect to the fixing plate 74 and a hole 73c narrowed on an inner side and configured to communicate with a space in the accommodation surface 70. In addition, the lower portion of the third stage 73 is formed with a pin hole 73e for positioning with respect to the second stage 72, on a surface formed back-to-back and parallel to a lower end surface on which the pin hole 73b is formed. Thereby, by interposing a pin 76 (refer to FIG. 6) between the pin hole 72b of the second stage 72 and the pin hole 73e of the third stage 73 while matching the positions of the pin holes, the circumferential positions about the axis center O of the accommodation surface 70 can be fixed with respect to the second stage 72 and the third stage 73.

As shown in section (b) in FIG. 9, the third stage 73 is formed with a diameter-enlarged surface 73a such that a portion of the accommodation surface 70 is enlarged in diameter. The diameter-enlarged surface 73a is formed within a range of a substantial angle θ3 about the axis center O of the substantially circular accommodation surface 70. The pin hole 73b is positioned at a substantial center of the range of the angle θ3 in which the diameter-enlarged surface 73a is formed.

As shown in the enlarged view of section (c) in FIG. 9, the diameter-enlarged surface 73 is formed by recessing a portion of the inner peripheral surface of the third stage 73 forming a portion of the accommodation surface 70. The range of the angle θ3 in which the diameter-enlarged surface 73 is formed as a diameter is equally enlarged in a radial direction by a thickness t3 within the range of the angle θ3 about the axis center O of the accommodation surface 70. An outside of the range of the angle θ3 is gradually reduced in inner diameter and is gradually connected to a surface of a non-recessed portion of the accommodation surface 70. The angle θ3 is within a range of 50° to 110°, preferably 80° to 100°, and is more preferably 90° about the axis center O of the accommodation surface. The thickness t3 is equal to or greater than 0.2 mm and equal to or smaller than 0.5 mm, and is preferably 0.3 mm.

As shown in section (a) in FIG. 10, the fixing plate 74 has a plate shape having a rectangular section where an upper surface is cut into a cylinder shape to form a circular fitting hole 74a. The fitting hole 74a is formed to have such a size that an outer peripheral surface of a ring member 78 (refer to FIG. 6) is fitted, and the fixing plate 74 is configured so that the third stage 73 is attached thereto via the ring member 78. A bottom surface of the fitting hole 74a is formed with a plurality of pin holes 74b. Thereby, by interposing a pin 77 (refer to FIG. 6) between the pin hole 73b of the third stage 73 and one of the pin holes 74b of the fixing plate 74 while matching the positions of the pin holes, the circumferential positions about the axis center O of the accommodation surface 70 can be fixed with respect to the third stage 73 and the fixing plate 74.

As shown in section (b) in FIG. 10, the plurality of pin holes 74b of the fixing plate 74 is formed in each of angles θ4 about the axis center O of the substantially circular accommodation surface 70. Specifically, each of the pin holes 74b is formed to be the same in distance from the axis center O of the accommodation surface 70 and to be positionally aligned with the pin hole 73b of the third stage 73. The angle θ4 is a range from 30° to 45° about the axis center O of the accommodation surface, and is 45°, in the present embodiment.

The first stage 71, the second stage 72 and the third stage 73 are adapted to integrally rotate as being positionally determined in the circumferential direction by the pins 75 and 76, and the third stage 73 is positionally determined with respect to the fixing plate 74, in a state of being rotated in the circumferential direction with respect to the fixing plate 74. Thereby, the temperature adjustment station 20 can change the circumferential positions of the diameter-enlarged surfaces 71a, 72a and 73a according to the preform 1 to be inserted.

In the below; the temperature adjustment step in the temperature adjustment station of the present embodiment is described.

First, the blow molding apparatus 100 demolds the preform 1 from the injection molding station 10 at high temperatures. At this time, a high-temperature portion distributed in a vertically extending aspect, i.e., in a vertical stripe pattern may be generated at a portion in the circumferential direction of the body portion 2 of the preform 1.

When the preform 1 is demolded at high temperatures from the injection molding station 10, the blow molding apparatus 100 conveys the preform 1 to the temperature adjustment station 20.

When the preform 1 is conveyed to the temperature adjustment station 20, the blow molding apparatus 100 accommodates the preform 1 into a cavity defined by the accommodation surface 70 of the temperature adjustment pot 22 so that the high-temperature portion of the preform 1 distributed in the vertical stripe shape matches the positions of the diameter-enlarged portions 71a, 72a and 73a. Note that, as for the positional relationship between the high-temperature portion of the preform 1 distributed in the vertical stripe shape and the diameter-enlarged portions 71a, 72a and 73a, the positions thereof are adjusted in advance according to a result of a test molding of the preform 1 performed before molding the preform 1 becoming an intermediate product during actual continuous production. At this time, the position adjustment is performed by changing the position of the pin hole 74b for positioning the third stage 73 with respect to the fixing plate 74.

When the preform 1 is accommodated inside the accommodation surface 70, the blow molding apparatus 100 arranges, in the neck portion 3 of the preform 1, the temperature adjustment rod 21a having a flow regulating member capable of improving cooling efficiency of cooling blow.

When the temperature adjustment rod 21a is arranged in the neck portion 3 of the preform 1, the blow molding apparatus 100 inflates the preform 1 by preliminary blow, for example, by first low-pressure air of 0.1 MPa or higher and 0.4 MPa or lower, and brings the high-temperature portion of the preform 1 distributed in the vertical stripe shape into contact with the surfaces of the diameter-enlarged portions 71a, 72a and 73a. At this time, the high-temperature portion distributed in the vertical stripe shape is locally slightly stretched, so that the heat thereof is reduced and the temperature is thus lowered as compared to the other portion.

When the preliminary blow is performed, the blow molding apparatus 100 introduces and circulates second low-pressure air of 0.1 MPa or higher and 0.4 MPa or lower into the preform 1 by cooling blow, thereby cooling the preform 1 by the air and the temperature adjustment pot 22. At this time, as the flow regulating member of the temperature adjustment rod 21a inserted into the preform 1, the flow regulating member whose portion facing the high-temperature portion of the preform 1 distributed in the vertical stripe shape is cut in half to form a flow path is preferably used because the temperature unevenness elimination is further promoted.

When the preform 1 is cooled, the blow molding apparatus 100 pulls out the preform 1 from the temperature adjustment rod 21a and pulls out the preform 1 from the temperature adjustment pot 22.

When the preform 1 is pulled out from the temperature adjustment pot 22, the blow molding apparatus 100 conveys the preform 1 whose temperature unevenness in the circumferential direction has been eliminated to the blow molding station 30.

The temperature adjustment station 20 of the present embodiment has the diameter-enlarged portions 71a, 72a and 73a each formed at each of the first stage 71, the second stage 72 and the third stage 73. Thereby, the temperature adjustment station 20 can eliminate the circumferential temperature unevenness, i.e., the local high-temperature portion of the preform 1.

Fourth Embodiment

Figure 11:
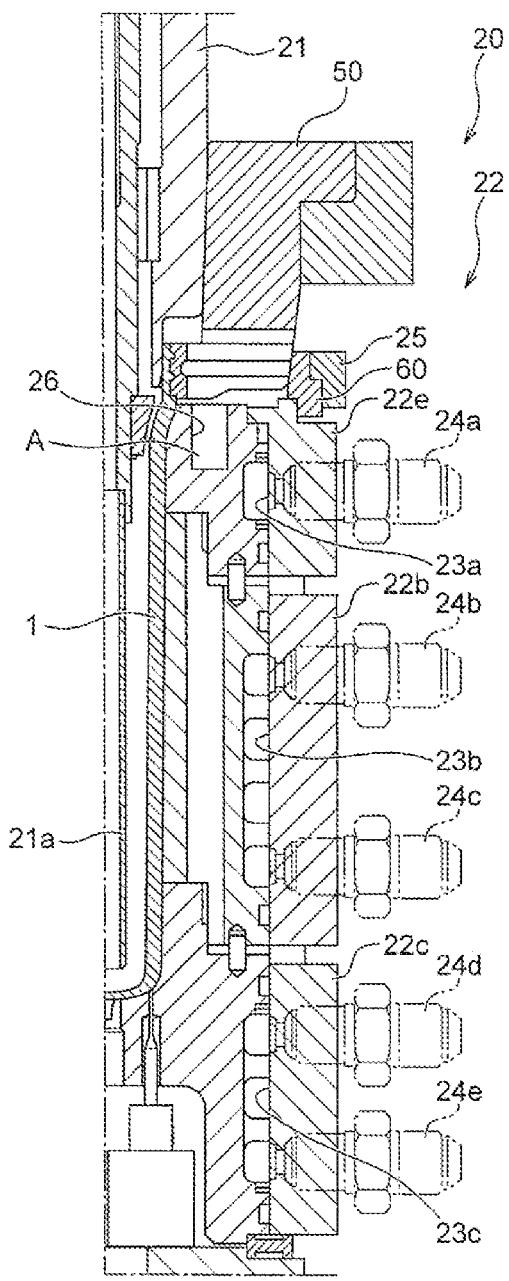
FIG. 11 is a cross-sectional view of a temperature adjustment station according to a fourth embodiment, as seen from the front.

FIG. 11 is a cross-sectional view of a temperature adjustment station, as seen from the front. Note that, in the fourth embodiment, parts different from the first embodiment are described, and the configurations in the drawings, which are substantially the same as the first embodiment, are denoted with the same reference signs.

As shown in FIG. 11, a first stage 22e of the temperature adjustment pot 22 is formed with an annular groove 26 having a rectangular section so as to surround the temperature adjustment rod 21a. The annular groove 26 is also formed with an air layer A in which air is interposed the annular groove 26, thereby functioning as an insulation structure. The temperature adjustment pot 22 has the insulation structure, so that when adjusting the temperature, it is possible to make it difficult for the lower portion of the neck portion 3 to be cooled without setting the first stage 22e to a high temperature, as compared to the first stage 22a of the first embodiment, and it is also possible to favorably stretch the lower portion of the neck portion 3 when blow-molding the preform 1 in the blow molding station 30. In addition, when the first stage 22d is set to a high temperature, like the first embodiment, it is possible to further suppress the temperature of the lower portion of the neck portion 3 from being lowered when performing the cooling by allowing the air to flow in the preform 1. Accordingly, it is possible to effectively prevent the lower portion of the neck portion 3 from being cooled.

Fifth Embodiment

Figure 12:
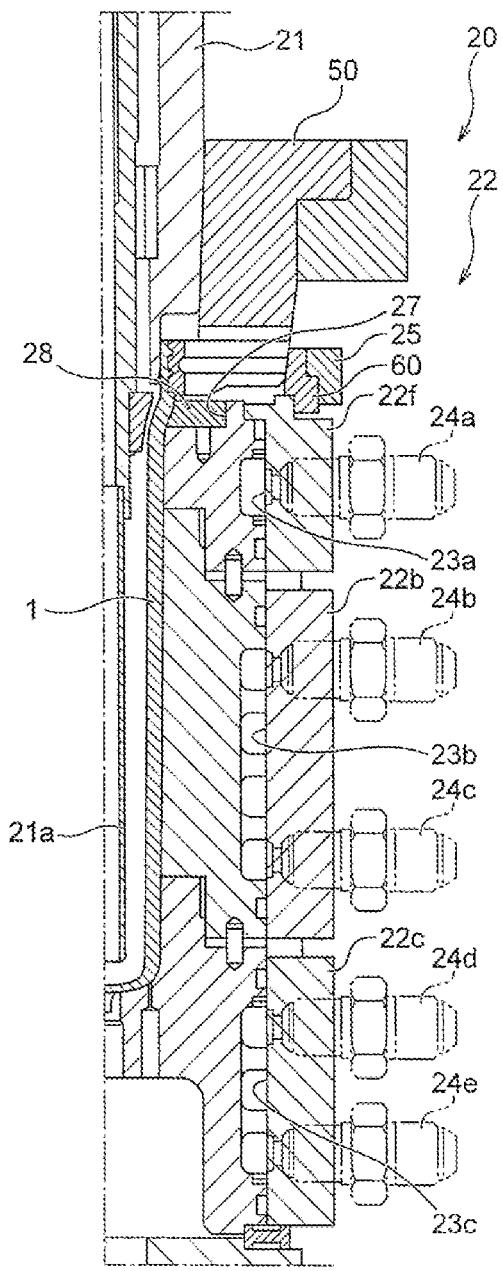
FIG. 12 is a cross-sectional view of a temperature adjustment station according to a fifth embodiment.
Figure 13A:
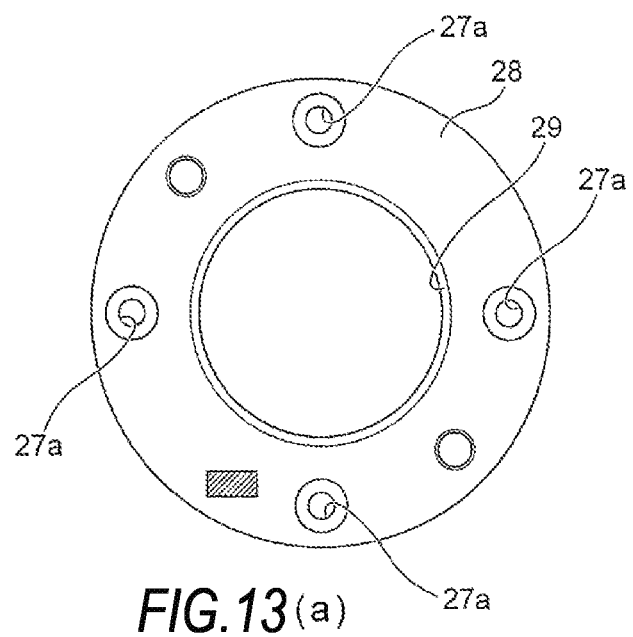
FIG. 13(a) is a top view and FIG. 13(b) is a cross-sectional view of an annular plate according to the fifth embodiment.
Figure 13B:
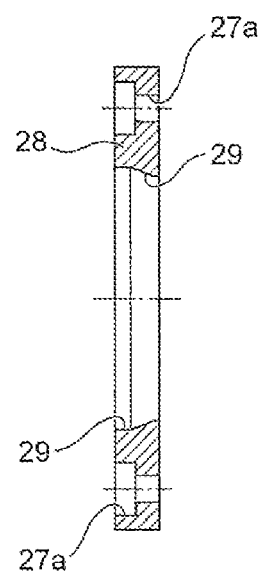

FIG. 12 is a cross-sectional view of a temperature adjustment station, as seen from the front, and FIG. 13 is a top view and a cross-sectional view of an annular plate. Section (a) in FIG. 13 is a top view of the annular plate, and section (b) in FIG. 13 is a cross-sectional view of the annular plate. Note that, in the fifth embodiment, parts different from the first embodiment are described, and the configurations in the drawings, which are substantially the same as the first embodiment, are denoted with the same reference signs.

In a first stage 22f of the temperature adjustment pot 22 of the present embodiment, as shown in FIG. 12, an annular plate 28 made of PEEK (polyetheretherketone) resin is incorporated as an insulation material in an annular groove 27. The annular groove 27 has a bottom surface that is a planar surface extending from a bottom portion of an inner peripheral surface formed at the first stage 22f toward a center of the inner peripheral surface.

As shown in section (a) in FIG. 13, the annular plate 28 incorporated in the annular groove 27 has a donut shape. The annular groove 27 is formed with a plurality of through-holes 27a, and screws are screwed into the bottom portion of the annular groove 27 through the through-holes 27a, so that the annular plate 27 is fixed to the annular plate 27.

As shown in section (b) in FIG. 13, the annular plate 28 has an inner peripheral surface inclined so that a diameter of an inner peripheral surface 29 is gradually reduced from one end toward the other end along a central axis. Thereby, the annular plate 28 is adapted to contact the preform 1 so that the lower portion of the neck portion 3 of the preform 1 inserted in the temperature adjustment pot 22 decreases in radius in a conical shape toward a bottom end of the preform 1.

The first stage 22f of the temperature adjustment pot 22 of the present embodiment also has an insulation structure, so that when adjusting the temperature, it is possible to make it difficult for the lower portion of the neck portion 3 to be cooled without setting the first stage 22e to a high temperature, as compared to the first stage 22a of the first embodiment, and it is also possible to favorably stretch the lower portion of the neck portion 3 when blow-molding the preform 1 in the blow molding station 30. In addition, when the first stage 22d is set to a high temperature, like the first embodiment, it is possible to further suppress the temperature of the lower portion of the neck portion 3 from being lowered when performing the cooling by allowing the air to flow in the preform 1. Accordingly, it is possible to effectively prevent the lower portion of the neck portion 3 from being cooled.

Sixth Embodiment

Figure 14:
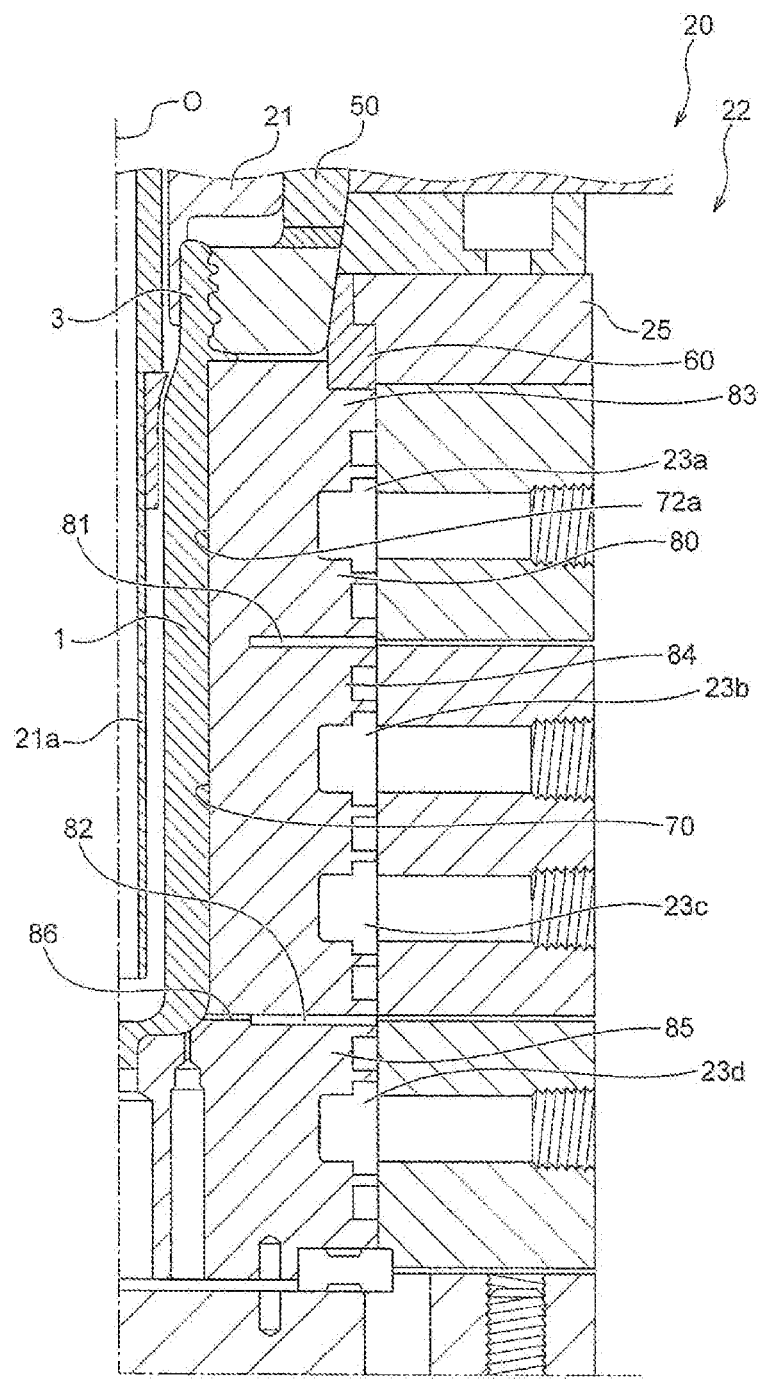
FIG. 14 is a cross-sectional view of a half of a temperature adjustment station according to a sixth embodiment, as seen from the front.

FIG. 14 is a cross-sectional view of a half of a temperature adjustment station according to a sixth embodiment, as seen from the front. Note that, in the sixth embodiment, parts different from the first embodiment are described, and the configurations in the drawings, which are substantially the same as the first embodiment, are denoted with the same reference signs.

As shown in FIG. 14, the temperature adjustment station 20 of the present embodiment includes a temperature adjustment pot body 80 where the temperature adjustment pot 22 is integrally formed without being dividing into a plurality of stages as separate members. Specifically, the body portion and bottom portion of the preform 1 inserted in the temperature adjustment pot 22 are in contact with the temperature adjustment pot body 80 on the accommodation surface 70 formed as one surface without a boundary. Note that, the temperature adjustment pot body 80 of the present embodiment has a diameter-enlarged surface 72a so that a portion of the accommodation surface 70 is enlarged, similar to the third embodiment.

Although the temperature adjustment pot body 80 is integrally formed, the temperature adjustment pot body 80 has, on an outer side thereof, a first groove portion 81 and a second groove portion 82 such that it is divided into three regions 83, 84 and 85. Specifically, the temperature adjustment pot body 80 has three stages (temperature adjustment blocks) having different temperature settings, similar to the first embodiment. However, the respective stages are integrally formed, and the first groove portion 81 is formed between the first region 83 corresponding to the first stage and the second region 84 corresponding to the second region corresponding to the second stage, and the second groove portion 82 is formed between the second region 84 and the third region 85 corresponding to the third stage. Each of the first groove portion 81 and the second groove portion 82 is formed to have a width of 1 mm or greater and 5 mm or smaller, preferably 1.5 mm or greater and 2.5 mm or smaller along the insertion direction of the preform 1, and is air-insulated via air. Thereby, the first groove portion 81 insulates between the first region 83 and the second region 84, and the second groove portion 82 insulates between the second region 84 and the third region 85. Note that, the first groove portion 81 and the second groove portion 82 may be insulated via PEEK resin.

In a case where the air between the preform 1 and the accommodation surface 70 is difficult to be degassed (for example, the preform 1 has an elongated shape), the bottom of the second groove portion 82 may be formed with a slit 86 penetrating through the accommodation surface 70 such that the space in the accommodation surface 70 fluidly communicates with the second groove portion 82. Thereby, since the air staying between the outer peripheral surface of the preform 1 and the accommodation surface 70 of the temperature adjustment pot 20 is exhausted, i.e., degassed, the slit 86 functions as an air vent. Note that, the slit 86 is preferably provided in a position corresponding to the bottom portion of the preform 1 so as to make a line inconspicuous, which is formed on the preform 1 as a result of the slit 86 colliding with the preform 1. In addition, a width of the slit is preferably set smaller than widths of the first groove portion 81 and the second groove portion 82.

Since the multistage-type temperature adjustment pot of the related art is divided into a plurality of stages, a boundary mark, i.e., a division line is always formed on the preform. The division line is likely to cause the poor appearance such as poor thickness of the container 1a, which is a bottle, and a ring-shaped line.

The temperature adjustment pot 20 of the present embodiment does not have such a configuration where it is divided into the upper and lower separate portions, because the temperature adjustment pot body 80 forming the accommodation surface 70 is integrally formed. Therefore, even when the preform 1 is subjected to the temperature adjustment or cooling treatment, the boundary that is formed when the accommodation surface 70 is divided is not formed as a division line on the preform 1.

In addition, the temperature adjustment pot body 80 is divided into the three regions 83, 84 and 85 whose boundary portions are insulated by the first groove portion 81 and the second groove portion 82. Thereby, a temperature difference can be generated in the fluid that flows through each of the flow path 23a of the first region 81, the flow path 23b of the second region 84 and the flow path 23c of the third region 85, so that a temperature difference can be generated in the upper and lower direction of the preform 1 or the temperature difference in the upper and lower direction can be eliminated. Thereby, even when the preform 1 is long, the temperature adjustment and the cooling in the upper and lower direction can be favorably implemented.

Note that, in the present invention, a setting temperature of an injection cylinder (barrel) of the injection device (not shown) configured to introduce the material of the preform 1 into the injection mold constituted by the injection cavity mold 12 and the like of the injection molding station 10, and setting temperatures of a block part and a nozzle part of a hot runner (HR) arranged between the injection device and the injection mold are preferably set to temperatures lower than the molding method of the related art by 5° C. to 15° C. more. For example, in a case where the material of the preform 1 is PET, the temperatures can be set as shown in Table 1. Thereby, since it is not necessary to uselessly melt the material (PET) of the preform 1 at high temperatures in the injection device, it is possible to mold the high-quality preform 1 where the deterioration of the material is suppressed. In addition, since it is possible to mold the preform 1 at lower temperatures than the molding method of the related art, it is possible to shorten the cooling time of the preform in the temperature adjustment station 20.

TABLE 1

| Temperature of injection cylinder (° C.) | | | | Temperature of hot runner (° C.) | |
|---|---|---|---|---|---|
| Nozzle part | Front part | Intermediate part | Rear part | Block part | Nozzle part |
| 270 to 280 | 260 to 270 | 260 to 270 | 260 to 270 | 260 to 280 | 260 to 280 |

In addition, the preform 1 preferably has a shape different from the preform of the related art. For example, when molding the container 1a whose capacity is about 0.3 L to 1 L, the thickness of the body portion wall of the storage portion 2 of the preform 1 is set to 2.5 mm to 8.0 mm, preferably within a range of 3.0±0.8, so that the body portion wall is made thicker than the preform of the related art when molding an equivalent container, thereby shortening the length of the body portion. By this method, since the injection space of the injection mold becomes wider than the related art, it is possible to introduce the material at a low pressure from the injection device into the injection mold while shortening the injection molding time (injection cycle time), as compared to the related art. As a result, it is possible to mold the preform 1 into a high-quality even in a blow molding apparatus of a high cycle. On the other hand, according to the method of shortening the injection molding time of the preform of the related art, it was generally to thin the body portion wall. In this case, however, the stretch ratio (surface ratio) when molding a container from a preform is reduced, so that the physical properties of the container are lowered. Specifically, it was necessary to sacrifice the physical properties of the container so as to shorten the injection molding time. In addition, when the body portion wall of the preform is thin, the temperature unevenness during the injection molding relatively increases, as compared to a case where the body portion wall is thick, so that the moldability is lowered. In the present invention, since it is possible to favorably cool even the thick preform 1 in the temperature adjustment station 20, it is possible to use the preform 1 having the above-described shape, to shorten the molding cycle, and to maintain and improve the physical properties of the container.

Further, before the preform 1 for which the temperature adjustment (cooling) has been completed in the temperature adjustment station 20 is conveyed to the blow molding station 30, the preform is preferably made to stand by for a predetermined time with being held on the neck mold 50 in a state where the preform is demolded from the temperature adjustment rod 21a and the temperature adjustment pot 22. The predetermined time is set, for example, to ⅓ or less, preferably ¼ or less of the injection molding time. The temperature equalizing treatment is further performed for the preform 1 that has been once temperature-adjusted, so that it is possible to favorably eliminate the temperature unevenness remaining in the preform 1 in a short time. At the same time, it is possible to lower the preform 1 to a temperature suitable for blow molding. Thereby, while it is possible to reduce blow molding defects, such as fish eyes (tears pattern), ring patterns (stretch unevenness) and orange peel (surface roughness in a satin state) due to the temperature unevenness of the preform 1, it is possible to improve the physical properties and to blow-mold the container 1a into a higher quality.

Note that, when demolding the preform 1 in the high-temperature state from the injection core mold 11 of the injection molding station 10, the preform 1 may be deformed into an uncorrectable shape. In order to suppress this, a method of ejecting the air into the preform 1 from the injection core mold 11 immediately before the demolding may be adopted. Specifically, in the mold-closed state of the injection mold, the inner wall of the preform 1 and the outer surface of the injection core mold 11 may be separated/contacted by the air. In this configuration, for example, the injection core mold 11 is provided with an annular air slit in a region facing a portion immediately below the neck portion 1, and an air circuit to communicate with the slit is embedded. Thereby, it is possible to securely prevent deformation of the preform 1 during the demolding at high temperatures.

Although the present invention has been described with reference to the embodiments, the present invention is not limited thereto. For example, in the above embodiment, the temperature adjustment station 20 where the preform 1 is arranged between the temperature adjustment rod 21a and the temperature adjustment pot 22 and the air is blown and circulated from the temperature adjustment rod 21a into the preform 1 is used. However, the present invention is not limited thereto. When the mold surface temperatures of the lower stages 22b and 22c other than the first stage 22a are lower than the glass transition temperature of the preform 1 by 10° C. or more, a temperature adjustment station configured to cool the preform 1 while sandwiching and compressively deforming the preform with the temperature adjustment rod and the temperature adjustment pot may also be used.

In the above embodiments, the cooling blow is performed after performing the preliminary blow. However, the preliminary blow may be performed after performing the cooling blow. By performing the preliminary blow after performing the cooling blow, the preform 1 that has been sufficiently cooled and the temperature unevenness has been eliminated can be strongly closely contacted to the accommodation surface 70 of the temperature adjustment pot 20 and the temperature distribution more suitable for blow can be given to the preform 1. In particular, in a case where a multistage temperature adjustment pot is used, the temperature distribution in the upper and lower direction of the preform 1 becomes favorable. Particularly, when the eccentric temperature adjustment pot 20 of the third embodiment is together used, the temperature unevenness elimination of the preform 1 is further promoted, so that it is possible to mold a container having a favorable thickness distribution.

REFERENCE SIGNS LIST

1: preform
1a: container
2: storage portion
2a: body portion
2b: bottom portion
3: neck portion
10: injection molding station
11: injection core mold
12: injection cavity mold
20: temperature adjustment station (temperature adjusting device)
21: blow core for temperature adjustment 21a: temperature adjustment rod
21b: first connection portion
21c: second connection portion
22: temperature adjustment pot
22a: first stage (uppermost stage)
22b: second stage
22c: third stage
22d: second stage
22e: first stage (uppermost stage)
22f: first stage (uppermost stage)
23a: flow path
23b: flow path
23c: flow path
24a: connection portion
24b: connection portion
24c: connection portion
24d: connection portion
24e: connection portion
25: hollow portion
26: annular groove
27: annular groove
28: annular plate
29: inner peripheral surface
30: blow molding station
31: blow mold
40: take-out station
50: neck mold
50: conveying section
60: ring
70: accommodation surface
71: first stage
72: second stage
73: second stage
73: diameter-enlarged surface
74: fixing plate
74a: fitting hole
75: pin
76: pin
77: pin
78: ring member
80: temperature adjustment pot body
81: first groove portion
82: second groove portion
83: first region
84: second stage
85: third stage
86: slit
100: blow molding apparatus (resin container manufacturing apparatus)
A: air layer
O: axis center
Z: axis center

The invention claimed is:

1. A mold for temperature adjustment which is to be provided on a temperature adjustment station of a resin container manufacturing apparatus and which is capable of adjusting temperature of one or more bottomed hollow preforms at the same time, the resin container manufacturing apparatus at least including an injection molding station configured to injection-mold the preform, the temperature adjustment station configured to adjust a temperature of the injection-molded preform, a blow molding station configured to blow-mold the temperature-adjusted preform, and a neck mold configured to convey the preform to each of the molding stations,
wherein the mold for temperature adjustment at least comprises:
a plurality of temperature adjustment blocks aligned in an upper and lower direction;
a centering ring provided on an upper portion of the temperature adjustment block located on the uppermost stage, and configured to come in contact with the neck mold; and
a fixing plate disposed below the plurality of temperature adjustment blocks,
the temperature adjustment blocks at least comprises:
an accommodating portion configured to accommodate a body portion or a bottom portion of the preform;
a flow path formed around the accommodating portion and in which a temperature adjustment medium is to flow; and
a connection portion configured to be connected to the flow path and to flow or flow out the temperature adjustment medium, and
an insulation structure is provided on a boundary between the plurality of temperature adjustment blocks, and
wherein the plurality of temperature adjustment blocks are formed by a single temperature adjustment pot without the boundary at the accommodating portion.

2. The mold for temperature adjustment according to claim 1,
wherein the insulation structure is a groove which is formed on an outer peripheral surface of the boundary and in which an air is interposed.

3. The mold for temperature adjustment according to claim 2,
wherein a width of the groove is 1.5 mm or greater and 2.5 mm or smaller, in the upper and lower direction.

4. The mold for temperature adjustment according to claim 1,
wherein the insulation structure is formed by a groove which is formed on an outer peripheral surface of the boundary and an insulation material interposed the groove.

5. The mold for temperature adjustment according to claim 2,
wherein the insulation structure is formed so as not to reach an inner surface of the accommodating portion.

6. The mold for temperature adjustment according to claim 1,
wherein an insulation mechanism is provided at the uppermost stage of the temperature adjustment block.

7. The mold for temperature adjustment according to claim 6,
wherein the insulation mechanism is formed by a groove which is formed on the uppermost stage of the temperature adjustment block, and an insulation material capable of being fitted into the groove.

8. The mold for temperature adjustment according to claim 6,
wherein the insulation mechanism is a groove which is formed on an upper surface of the uppermost stage of the temperature adjustment block and in which an air is interposed.

9. The mold for temperature adjustment according to claim 1,
wherein the temperature adjustment block is provided with an arc-shaped diameter-enlarged portion at a part of an outer periphery of the accommodating portion over a predetermined angle range.

10. The mold for temperature adjustment according to claim 1, wherein the temperature adjustment block is provided with a hollow portion between the accommodating portion and the flow path.

11. The mold for temperature adjustment according to claim 1,
wherein the temperature adjustment block located on the uppermost stage is capable of being set to the highest temperature, and
wherein the temperature adjustment block located on a lower stage other than the uppermost stage is capable of being set to a temperature lower than a glass transition temperature of a material of the preform by 10° C. or more.

12. The mold for temperature adjustment according to claim 1, further comprising a temperature adjustment rod and a blow core for temperature adjustment which are configured to circulate an air inside the preform which is to be accommodated in the temperature adjustment pot.

13. A resin container manufacturing method using the mold for temperature adjustment according to claim 1, the resin container manufacturing method comprising:
injection-molding the preform in the injection molding station;
adjusting a temperature of the injection-molded preform in the temperature adjustment station; and
blow-molding the temperature-adjusted preform in the blow molding station.

14. A resin contained manufacturing apparatus comprising:
the mold for temperature adjustment according to claim 1.

* * * * *